United States Patent [19]
Wilson et al.

[11] Patent Number: 5,895,848
[45] Date of Patent: Apr. 20, 1999

[54] APPARATUS AND METHOD FOR LEVEL SENSING IN A CONTAINER

[75] Inventors: Jeffrey D. Wilson, Newcastle; Carl R. Haynie, Pilot Hill; William L. McGeary, Huntington Beach, all of Calif.

[73] Assignee: Flowline Inc., Los Alamitos, Calif.

[21] Appl. No.: 08/587,213

[22] Filed: Jan. 16, 1996

[51] Int. Cl.$^6$ ............................................. G01F 1/00
[52] U.S. Cl. ................................. 73/290 V; 73/290 R
[58] Field of Search .................. 73/290 V; 340/618, 340/619, 620, 621

[56] References Cited

U.S. PATENT DOCUMENTS

| | | |
|---|---|---|
| 3,213,438 | 10/1965 | Felice et al. |
| 3,625,058 | 12/1971 | Endress et al. |
| 3,944,994 | 3/1976 | Fanshawe ........................ 340/244 R |
| 4,213,337 | 7/1980 | Langdon ............................... 73/290 V |
| 4,349,881 | 9/1982 | November et al. ....................... 364/509 |
| 4,383,443 | 5/1983 | Langdon ............................... 73/290 V |
| 4,540,981 | 9/1985 | Lapetina et al. ........................ 340/618 |
| 4,594,584 | 6/1986 | Pfeiffer et al. ......................... 340/620 |
| 5,099,454 | 3/1992 | Dieulesaint et al. .................. 73/290 V |
| 5,191,316 | 3/1993 | Dreyer ................................. 73/290 V |
| 5,223,819 | 6/1993 | Marsh et al. .......................... 340/617 |
| 5,247,832 | 9/1993 | Umezawa et al. .................... 73/290 V |
| 5,264,831 | 11/1993 | Pfeiffer ................................ 340/621 |
| 5,408,168 | 4/1995 | Pfandler ............................... 318/642 |

*Primary Examiner*—George M. Dombroske
*Assistant Examiner*—Ronald L. Biegel
*Attorney, Agent, or Firm*—Sheppard, Mullin, Richter & Hampton; James R. Brueggemann

[57] ABSTRACT

A liquid level sensing apparatus, and related method, that utilizes a tuning fork assembly to detect the presence of not only a liquid or air at a particular location within a container, but also a solid material at that location. The tuning fork assembly includes an excitation transducer and a receiving transducer mechanically coupled to a pair of paddles that are exposed within the container, and a phase-locked loop control system applies an excitation signal to the excitation transducer having a frequency that is regulated to track the tuning fork's resonant frequency. A comparator compares that resonant frequency with a prescribed threshold, to determine whether the tuning fork assembly is disposed in air or a liquid. A failure of the phase-locked loop control system to lock the frequency of the excitation signal at any particular frequency indicates that the tuning fork assembly is over-damped and likely contacted by a solid material. Since the apparatus normally excites the tuning fork assembly at its resonant frequency, this allows the apparatus to be operated at reduced power levels, leading to improved efficiency.

19 Claims, 5 Drawing Sheets

APPARATUS AND METHOD FOR LEVEL SENSING IN A CONTAINER

BACKGROUND OF THE INVENTION

This invention relates generally to devices for sensing the level of a liquid in a container and, more particularly, to devices of this kind that utilize a tuning fork or the like whose resonant frequency changes when contacted by the liquid.

Devices of this particular kind generally include a tuning fork disposed at a fixed location within the container, with both an excitation transducer and a receiving transducer mechanically coupled to the tuning fork. An oscillator generates an electrical excitation signal that is coupled to the excitation transducer, to mechanically oscillate the tuning fork. The receiving transducer senses this oscillation and produces a receive signal having an amplitude and frequency corresponding to the sensed oscillation. The tuning fork's oscillation is damped by the medium (i.e., gas or liquid) in which it is disposed, and its resonant frequency generally varies according to whether it is disposed in the gas or the liquid.

Typically, the excitation signal produced by the oscillator has a frequency that is made to sweep a frequency band that encompasses the tuning fork's resonant frequency both when disposed in the gas and when disposed in the liquid. By determining the particular frequency within this range at which the amplitude of the receive signal is a maximum, the tuning fork's resonant frequency can be determined. Alternatively, a series of pulses having a known frequency spectrum can be applied to the excitation transducer, and the resulting receive signal can be analyzed in a frequency discriminator to determine the tuning fork's resonant frequency. From the resonant frequency determination, the presence of the gas or liquid adjacent to the tuning fork can be determined.

In other level sensing devices of this kind, the resonant frequency of the tuning fork can be determined using a phase discriminator that monitors the relative phases of the excitation signal applied to the excitation transducer and the receive signal produced by the receiving transducer. Such devices utilize a recognition that the phase of the receive signal changes significantly at or near the tuning fork's resonant frequency.

Although the level sensing devices described briefly above can function reliably to detect the presence or non-presence of a liquid at a particular location within a container, the devices are believed to be unduly complicated and to consume an excessive amount of electrical power. There is therefore a need for an improved level sensing device that can reliably sense the presence or non-presence of a liquid at a particular location within a container, with reduced complexity and with reduced power consumption. The present invention fulfills this need.

SUMMARY OF THE INVENTION

The present invention is embodied in an apparatus, and related method, that uses a tuning fork or the like for reliably sensing the level of a liquid in a container, with reduced complexity and reduced power consumption. The tuning fork is located at a predetermined location within the container, and the apparatus further includes a feedback control system configured to cause the tuning fork to oscillate substantially at its resonant frequency and a frequency comparator that compares this oscillation frequency with one or more frequency thresholds, to sense the presence or non-presence of the liquid at the predetermined location in the container.

The feedback control system includes an excitation transducer and a receiving transducer that are each mechanically coupled to the tuning fork, and the system further includes an oscillator that produces an excitation signal coupled to the excitation transducer, which causes the tuning fork to oscillate at a frequency corresponding to that of the excitation signal. The receiving transducer then produces a receive signal having a frequency and amplitude corresponding to that of the tuning fork's oscillation. A phase comparator that also is part of the feedback control system compares the phases of the receive and excitation signals, to produce an error signal that is coupled to the oscillator, to controllably adjust the excitation signal's frequency to correspond substantially with the tuning fork's resonant frequency.

In a more detailed feature of the invention, the feedback control system functions to repeatedly adjust the frequency of the excitation signal such that the phase of the receive signal produced by the receiving transducer is maintained in a predetermined relationship with the phase of the excitation signal, e.g., a 90-degree phase lag. This phase relationship preferably is selected to coincide substantially with the tuning fork's resonance. By operating continuously at or near the tuning fork's resonant frequency, power consumption can be minimized.

In another more detailed feature of the invention, the apparatus also is configured to sense the presence of a solid material at the site of the tuning fork within the container. This is achieved by determining that the feedback control system is failing to lock the frequency of the excitation signal at any one particular value, and the frequency of the excitation signal thus is varying continuously. When this occurs, it is determined that the tuning fork's oscillation is being damped considerably, as when the tuning fork is being contacted by a solid material. Thus, the apparatus senses the presence of a liquid or a gas at the site of the tuning fork by recognizing that the feedback control system has fixed the frequency of the excitation signal at a particular value and by then comparing that value with one or more frequency thresholds, and it senses the presence of a solid material at the site of the tuning fork by recognizing that the feedback control system has failed to fix the frequency of the excitation signal at any particular value.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
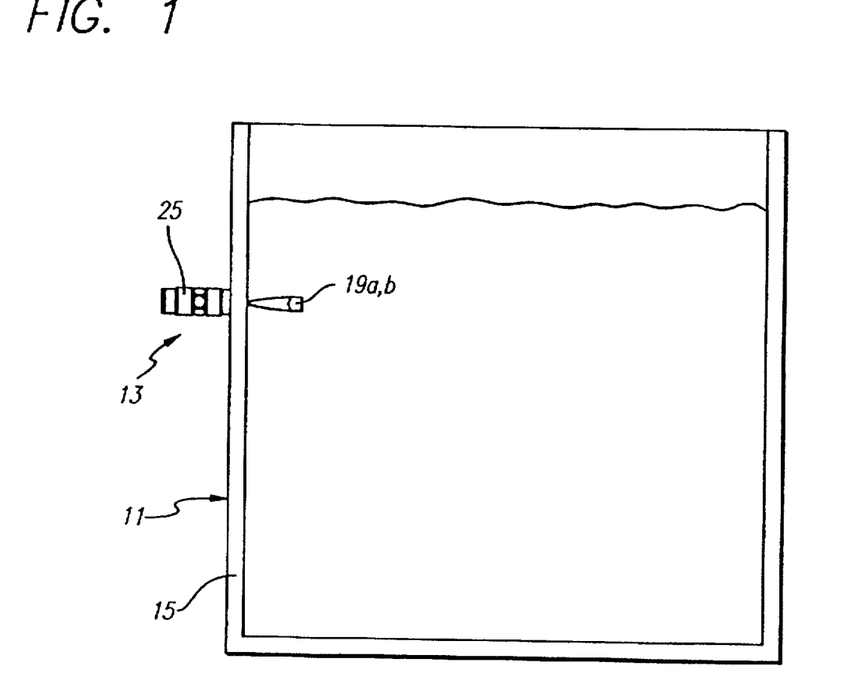
FIG. 1 is a simplified side cross-sectional view of a container for a liquid, with the tuning fork assembly of a level detector apparatus embodying the invention disposed at a particular location on the container's side.
Figure 2:
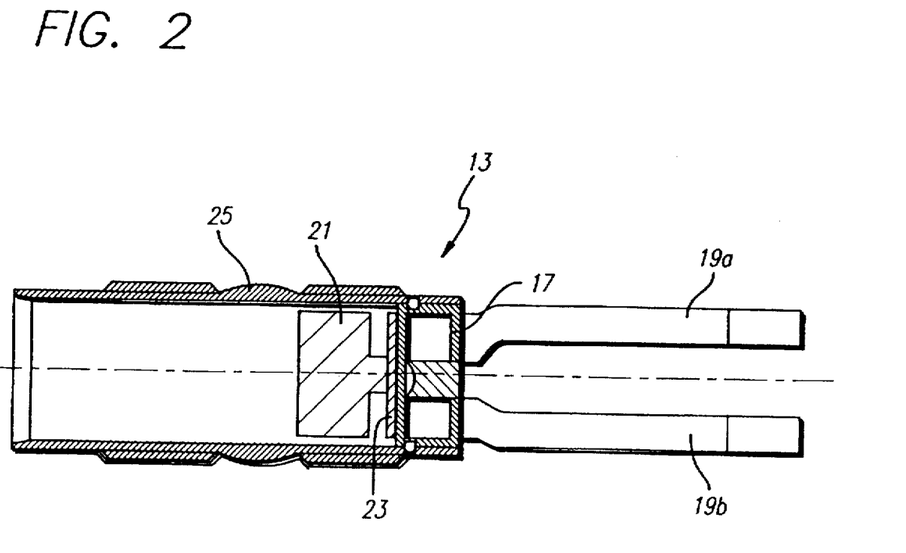
FIG. 2 is a cross-sectional view of the tuning fork assembly of FIG. 1, taken in a generally vertical direction.
Figure 3:
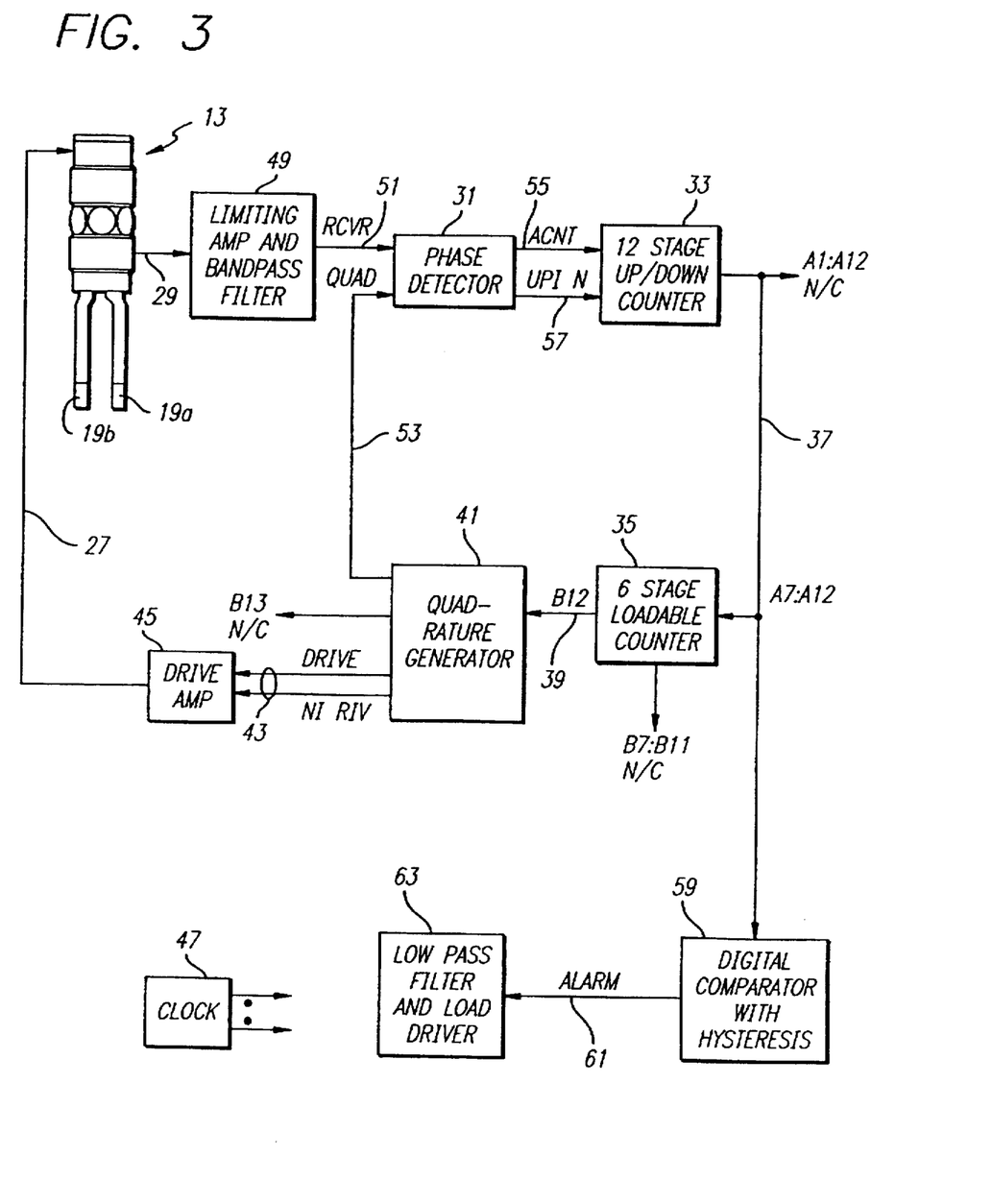
FIG. 3 is a simplified block diagram of the level detector apparatus that incorporates the tuning fork assembly of FIG. 1.

With reference now to the drawings, and particularly to FIGS. 1-3, there is shown a tuning fork level detector apparatus that senses the presence of a gas, a liquid, or a solid material at a predetermined location within a container 11. The apparatus includes a tuning fork assembly 13 mounted by any suitable means to a side wall 15 of the container, the assembly having a generally circular diaphragm 17 and a pair of spaced, parallel paddles 19a and 19b projecting horizontally from the diaphragm into the container. In this position, the paddles are exposed to whatever material (i.e., a gas, liquid, or solid) is disposed at that location within the container.

An excitation transducer 21 and a receiving transducer 23 are located within a rear housing 25 of the tuning fork assembly 13 and mechanically coupled to the diaphragm 17, on the side of the diaphragm opposite the paddles 19a and 19b. The excitation transducer conveniently can be an electronic buzzer/sound transducer, and the receiving transducer conveniently can include a piezo-electric crystal. The two transducers are aligned axially within the housing, in compressive engagement with backside of the diaphragm. Application of an excitation signal to the excitation transducer, via line 27, causes the transducer to vibrate in a corresponding manner, and this vibration is coupled directly to the diaphragm and, in turn, to the paddles. The resulting vibration of the paddles is coupled via the diaphragm to the receiving transducer 23, which produces a corresponding receive signal output on line 29.

Oscillation of the paddles 19a and 19b of the tuning fork assembly 13 is damped by the presence of any liquid or solid material in contact with the paddles. In addition, any such material contact will affect the assembly's resonant frequency. In general, the more viscous, or solid, the material, the greater the damping and the lower the resonant frequency. The magnitude and phase of the paddle oscillation is represented in the receive signal, which the receiving transducer 23 outputs on line 29.

Figure 4:
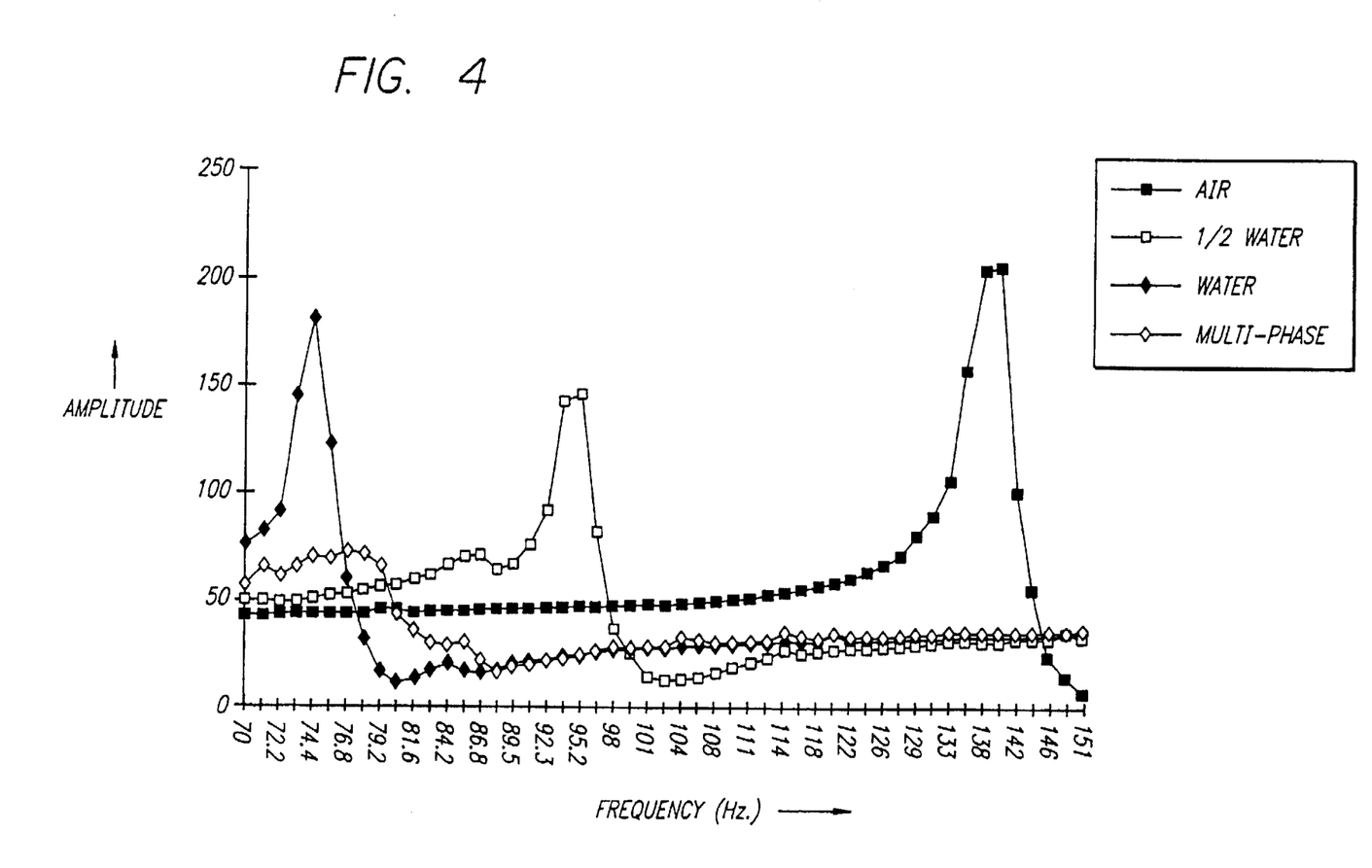
FIG. 4 is a graph of the amplitude of the receive signal produced by the receiving transducer of the level detector apparatus of FIGS. 1–3, as a function of the frequency of the excitation signal, for conditions in which the tuning fork assembly is contacted by air, by water, by an air/water combination, and by a solid.

FIG. 4 is a graph of the frequency response of the tuning fork assembly 13 for a variety of conditions, including conditions in which the paddles 19a and 19b are contacted by air, by water, by an air/water combination, and by a solid. Actually, this graph corresponds to the amplitude of the receive signal, output on line 29 by the receiving transducer 23, as the frequency of the excitation signal applied to the excitation transducer is swept across a predetermined frequency band.

It will be noted in FIG. 4 that each separate condition provides a peak amplitude, or resonance, at a different frequency. For example, the resonant frequency for the condition in which the paddles 19a and 19b are disposed entirely in air is about 140 Hz, and the resonant frequency for the condition in which the paddles are immersed entirely in water is about 77 Hz. If the paddles are only partially immersed in water, then the resonant frequency will lie intermediate those two frequency values, with the specific resonant frequency depending on the proportion of the paddles contacted by the water. It also will be noted that the condition in which the paddles are contacted by a solid material has a broad resonance in the range of 70 to 80 Hz, but that the amplitude of that resonant oscillation is diminished substantially from the amplitude for the conditions where the paddles are disposed in air and/or water.

Actually, depending on their particular geometry, the paddles 19a and 19b of the tuning fork assembly 13 will resonate at many different frequencies, extending over a wide frequency range. The limited frequency range depicted in FIG. 4, i.e., 70 Hz to 150 Hz, is considered a particularly useful operating range for the level detector apparatus, however, because it provides a relatively wide separation between the resonant frequencies for the conditions in which the paddles are disposed in air and in which the paddles are disposed in water.

Figure 5:
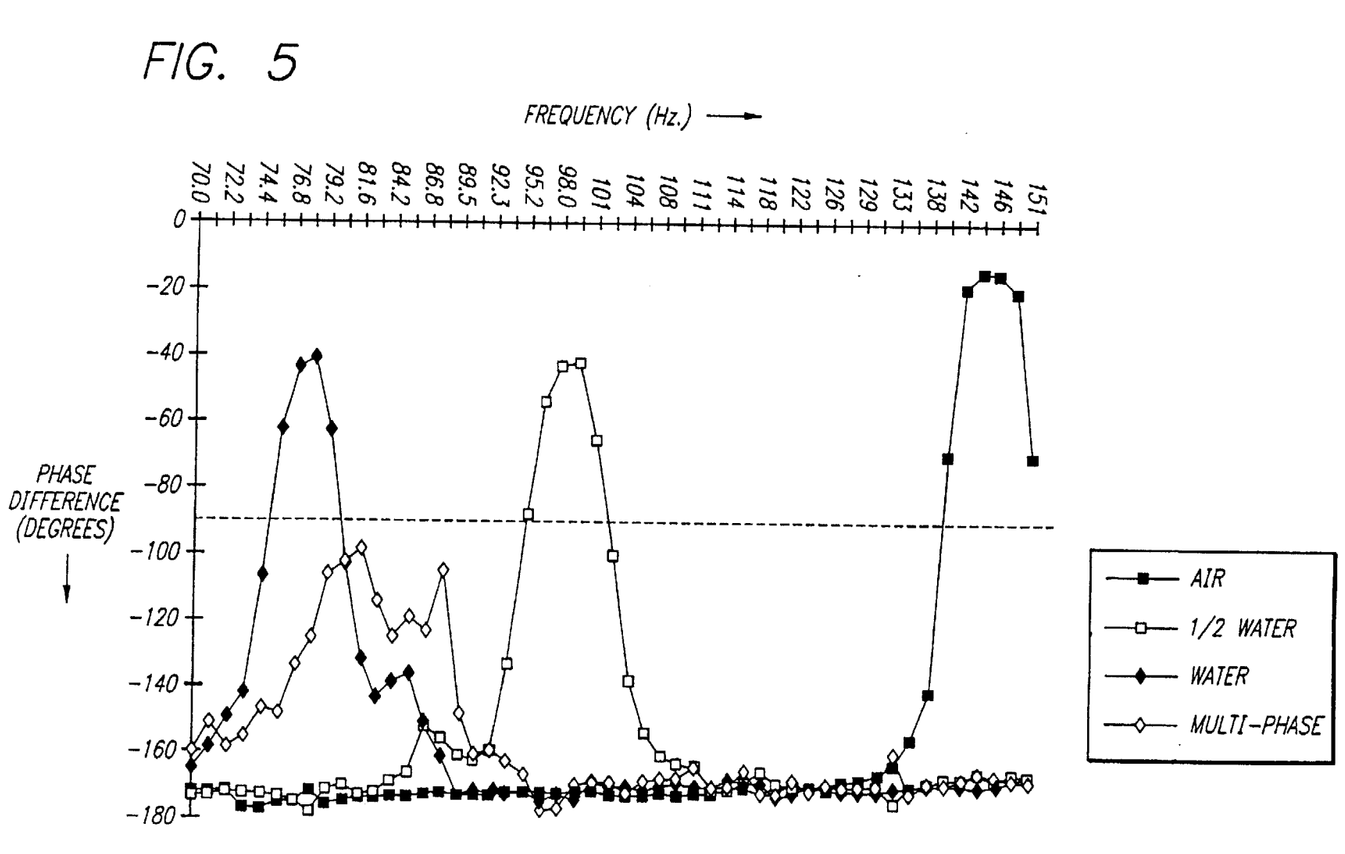
FIG. 5 is a graph of the phase difference between the receive signal and the excitation signal, as a function of the frequency of the excitation signal, for the same four conditions as set forth in the graph of FIG. 4.

FIG. 5 is a graph of the phase difference between the excitation signal supplied on line 27 to the excitation transducer 21 and the receive signal output on line 29 by the receiving transducer 23. It will noted that this phase difference undergoes a significant change at or near the resonant frequency for each possible condition for the paddles 19a and 19b, i.e., the paddles being contacted by air, by water, by an air/water combination, or by a solid. In particular, for each such condition, the phase difference between the two signals is about 180 degrees at most frequencies, but reduces toward zero degrees at frequencies near the resonant frequency.

The level detector apparatus of the invention advantageously utilizes this phase shift phenomenon to detect the tuning fork assembly's resonant frequency, and thereby to detect the presence of air, water, an air/water combination, or a solid material in contact with the paddles 19a and 19b. In particular, the apparatus is configured to regulate the frequency of the excitation signal supplied on line 27 to the excitation transducer 21, to track the tuning fork assembly's resonant frequency, and it achieves this tracking by phase comparing the excitation signal with the receive signal and by regulating the two signals to have a nominal phase difference of 90 degrees.

More particularly, and with reference again to the block diagram of FIG. 3, the level detector apparatus includes a phase-locked loop control system having a phase detector 31 that compares the phases of signals based on the receive signal and excitation signal, a 12-stage up/down counter 33 that stores a number representing the desired frequency of the excitation signal, and an oscillator in the form of a 6-stage loadable counter 35 that repeatedly counts to a predetermined maximum count, e.g., all "1's," from a number corresponding to the count currently stored in the up/down counter 33. The count from the up/down counter is repeatedly loaded into the loadable counter via lines 37.

A signal corresponding to the most significant stage of the loadable counter 35 is supplied on line 39 to a quadrature generator 41, to produce complementary drive signals of corresponding frequency. These complementary drive signals are in turn supplied on lines 43 to a drive amplifier 45, to produce the excitation signal. The excitation signal is then supplied on line 27 to the excitation transducer 21. A clock generator 47 generates appropriate clock signals for distribution to the various blocks of the level detector apparatus.

The receive signal output on line 29 by the receiving transducer 23 is supplied to a limiting amplifier and bandpass filter 49, which suitably buffers the signal and limits its bandwidth to the frequencies of interest, i.e., about 70 Hz to about 150 Hz. The filtered receive signal is then supplied on line 51 to the phase detector 31. Also supplied to the phase detector, on line 53 from the quadrature generator 41, is a quadrature signal that is related to the complementary drive signals output on lines 43, having an identical frequency, but orthogonal phase. The phase detector, therefore, effectively compares the phases of the excitation signal and the receive signal, with the result being a phase difference signal like that represented by the graph of FIG. 5.

In the preferred embodiment, the level detector apparatus regulates the frequency of the excitation signal such that the two signals supplied to the phase detector 31, which are based on the excitation signal and the receive signal, have a relative phase difference of 90 degrees. For example, if the phase difference is detected to be greater than 90 degrees during a particular clock cycle, then the phase detector outputs an ACNT signal on line 55 and an UPDN signal on line 57 to the up/down counter 33, to cause the stored count for the next cycle to be incremented. This increases the start count that will be loaded into the 6-stage loadable counter 35 for the next cycle, which results in a higher frequency for the excitation signal. This moves the control system's operating point to the right in FIG. 5, and this movement to the right will continue in ensuing cycles, until the phase difference finally has been detected to have reached a value of less than 90 degrees.

If and when the detected phase difference is detected to be less than 90 degrees during a particular clock cycle, then the ACNT signal and the UPDN signal output on lines 55 and 57, respectively, by the phase detector 31 will cause the count stored in the up/down counter 33 for the next cycle to be decremented. This decreases the start count that will be loaded into the 6-stage loadable counter 35 for the next cycle, which results in a lower frequency for the excitation signal. In this way, the phase difference is regulated to be about 90 degrees.

If the paddles 19a and 19b of the tuning fork assembly 13 are disposed entirely in air, then the frequency of the excitation signal will be about 140 Hz when the phase-locked loop control system has achieved phase lock. By contrast, when the paddles are immersed entirely in water, the frequency will be about 75 Hz and, when the paddles are disposed approximately 50% in air and 50% in water, the frequency will about 95 Hz.

If electrical noise or other problems ever cause the frequency of the excitation signal to be incremented sufficiently beyond the resonant frequency that the phase difference detected by the phase detector 31 has moved beyond its minimum point and exceeds 90 degrees (see FIG. 5), then the phase-locked loop control system will function automatically to continue incrementing the frequency. When the phase-locked loop's maximum frequency of about 150 Hz has been reached, the frequency will automatically toggle to the minimum value of about 70 Hz and the frequency incrementing will continue.

With reference again to FIG. 3, the six most significant bits currently stored in the up/down counter 33, which represent a number corresponding to the desired frequency for the excitation signal, are supplied on lines 37 not only to the loadable counter 35, but also to a digital comparator 57. The digital comparator first analyzes these bits to determine whether or not the phase-locked loop control system has locked onto any particular frequency. If it has, the comparator compares the number represented by the six received bits with a threshold selected to be at a prescribed midpoint between the tuning fork assembly's nominal resonant frequencies when the paddles 19a and 19b are disposed entirely in air (i.e., about 140 Hz) and when the paddles are disposed 50% in air and 50% in water (i.e., about 95 Hz). Preferably, a small amount of hysteresis (e.g., about 5% of the frequency value) is incorporated into the threshold comparison, to minimize adverse noise effects.

Thus, if the phase-locked loop control system has locked the frequency of the excitation signal at a particular value and if that value exceeds the prescribed threshold, then it is determined that the tuning fork assembly 13 is disposed in air. Conversely, if the phase-locked loop control system has locked the excitation signal's frequency at a particular value, but that value does not exceed the prescribed threshold, then it is determined that the tuning fork assembly is disposed in water.

Since the frequency of the excitation signal is normally regulated by the phase-locked loop control system to match the tuning fork assembly's resonant frequency, the tuning fork assembly 13 can be driven at a power level that is reduced substantially from what it would have to be at other frequencies. This enables the apparatus to operate substantially more efficiently.

If the paddles 19a and 19b of the tuning fork assembly 13 are contacted by a solid material of some kind, the magnitude of the paddle vibrations can be dampened sufficiently to prevent the phase-locked loop control system from locking the frequency of the excitation signal at any particular value. Consequently, the six most significant bits stored in the up/down counter 33, and supplied to the digital comparator on lines 37, will be varying continuously. A signal representing the most significant of these bits is supplied on line 61 to a low-pass filter and load driver circuit 63, which detects a continuous toggling of the signal. When such toggling is detected, an appropriate alarm signal is produced, indicating that the paddles have been contacted by a solid material.

Figure 6:
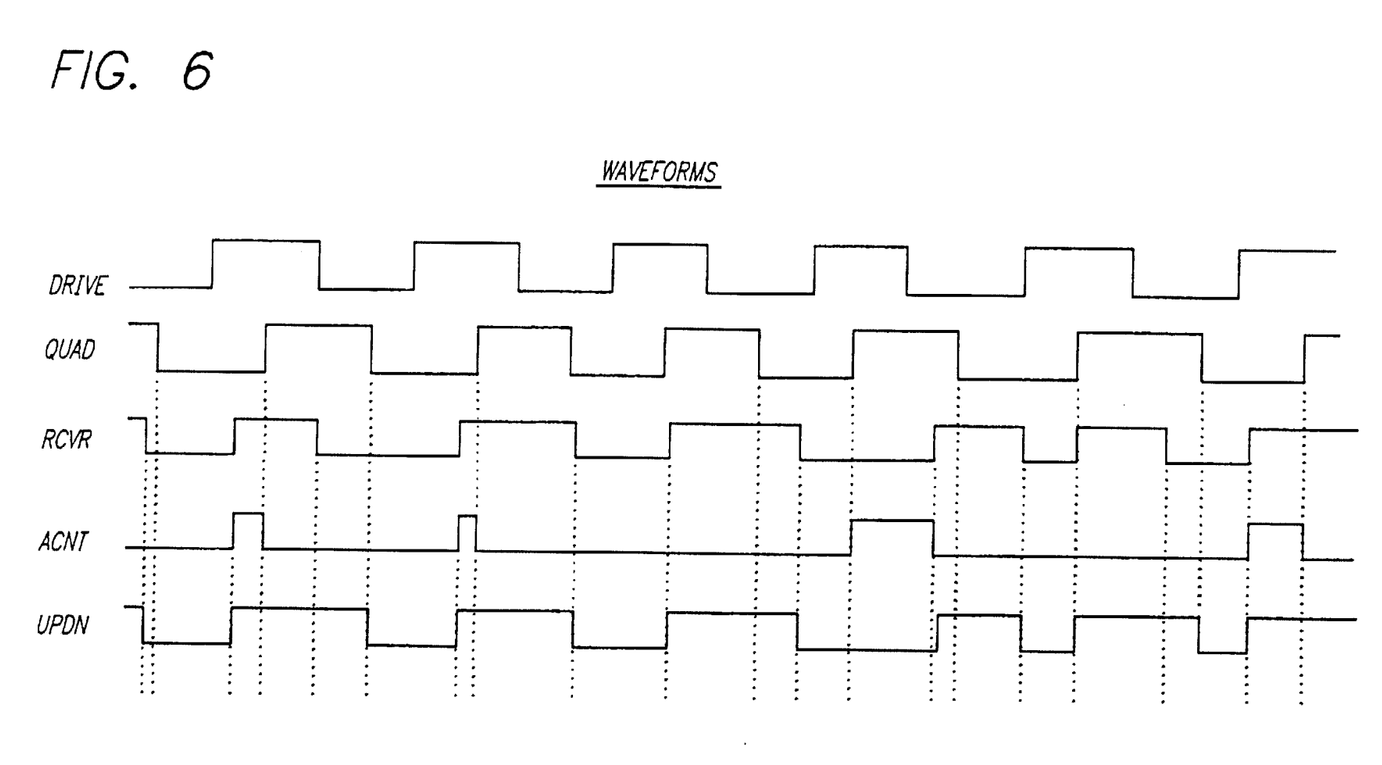
FIG. 6 is a timing diagram depicting various typical waveforms present at various locations in the block diagram of FIG. 3.

FIG. 6 depicts several typical signals present on various lines in the level detector apparatus of FIG. 3. A better understanding of the operation of the apparatus can be obtained by noting the relationships between these various signals. Line A of FIG. 6 depicts the digital drive signal output by the quadrature generator 41 on one of lines 43. This drive signal, together with its complementary signal (not depicted), are used by the drive amplifier 45 to produce the excitation signal, which is supplied to the excitation transducer 21 on line 27. The frequency of the drive signal, and thus the excitation signal, is regulated to have a frequency that tracks the resonant frequency of the tuning fork assembly 13. Line B of FIG. 6 depicts the quadrature signal output on line 53 by the quadrature generator. It will be noted that the frequency of the quadrature signal is identical to that of the drive signal on line A, but that its phase lags that of the drive signal by 90 degrees.

Line C of FIG. 6 depicts an exemplary receive signal that might be output by the receiving transducer 23 on line 29. This receive signal is suitably filtered by the limiting amplifier and bandpass filter 49 and transmitted on line 51 to the phase detector 31. The apparatus' phase-locked loop control system seeks to maintain the phase of this filtered receive signal aligned with that of the quadrature signal, which is supplied on line 53 to the phase detector. To this end, the phase detector compares the phase angles of the filtered receive signal and the quadrature signal and produces the ACNT signal output on line 55 and the UPDN signal output on line 57. The ACNT and UPDN signals are depicted in Lines D and E of FIG. 6.

It will be noted in FIG. 6 that the ACNT signal is normally low, but goes high for the duration of any time period in which a positive pulse of the receive signal leads a positive pulse of the quadrature signal and also for the duration of any time period in which a positive pulse of the quadrature signal leads a positive pulse of the receive signal. The UPDN signal is high during those time periods when a positive pulse of the receive signal leads a positive pulse of the quadrature signal, and it is low during those time periods when a positive pulse of the quadrature signal leads a positive pulse of the receive signal.

The ACNT and UPDN signals are provided to the UP/DN counter 33, with the ACNT signal functioning to enable the counter to be clocked, and with the UPDN signal functioning to direct that clocking to cause the stored count to be incremented or decremented. If the receive signal's phase leads the quadrature signal's phase, then the UPDN signal is high and the count is decremented. This decreases the count that is periodically loaded into the loadable counter 35 and thereby reduces the frequency of the excitation signal. This, in turn, tends to reduce the receive signal's phase lead. Conversely, if the quadrature signal's phase leads the receive signal's phase, then the UPDN signal is low and the count in the UP/DN counter is incremented. This increases the count that is periodically loaded into the loadable counter and thereby increases the frequency of the excitation signal. This, in turn, tends to reduce the receive signal's phase lag. In either case, each clocking of the UP/DN counter has a duration proportional to the magnitude of the phase lead or phase lag.

It should be appreciated from the foregoing description that the present invention provides an improved level detector apparatus, and related method, that utilizes a tuning fork assembly to detect the presence of not only a liquid or air at a particular location within a container, but also a solid material at that location. This is achieved by exciting the tuning fork assembly with an excitation signal having a frequency that is controllably regulated by a phase-locked loop control system to match the assembly's resonant frequency. A comparator compares that resonant frequency with a prescribed threshold, to determine whether the tuning fork assembly is disposed in air or a liquid. A failure of the phase-locked loop control system to lock the frequency of the excitation signal at any particular frequency indicates that the tuning fork assembly is over-damped and likely contacted by a solid material. Since the apparatus normally excites the tuning fork assembly at its resonant frequency, this allows the apparatus to be operated at reduced power levels, leading to improved efficiency.

Although the invention has been described in detail with reference only to the preferred embodiment, those skilled in the art will appreciate that various modifications can be made without departing from the invention. Accordingly, the invention is defined only by the following claims.

We claim:

1. Apparatus for sensing the level of a liquid in a container, comprising:

a mechanical oscillation device disposed within the container;

an oscillator that produces an electrical excitation signal having a controllably adjustable frequency within a predetermined frequency range;

an excitation transducer configured to mechanically excite the mechanical oscillation device in response to the electrical excitation signal;

a receiving transducer configured to produce an electrical receive signal in response to a mechanical oscillation of the mechanical oscillation device;

a phase comparator that compares the phase of the receive signal with the phase of the excitation signal and that produces an error signal that varies according to the phase difference, wherein the error signal is coupled to the oscillator, to controllably adjust the phase of the receive signal to have a predetermined relationship to the phase of the excitation signal and to maintain the frequency of the oscillation substantially the same as the resonant frequency of the mechanical oscillation device;

a frequency comparator that compares the frequency of the mechanical oscillation with a predetermined threshold, to sense the level of a liquid within the container, and a device that is operable when the error signal generated by the phase comparator fails to controllably adjust the phase of the receive signal to have predetermined relationship to the phase of the excitation signal, and thus fails to maintain the frequency of the oscillation substantially the same as the resonant frequency of the mechanical oscillation device, to determine that the mechanical oscillation device is contacted by a solid material.

2. Apparatus as defined in claim 1, wherein:

the mechanical oscillation device is a tuning fork; and the frequency comparator determines that the tuning fork is contacted by a liquid within the container when the oscillator produces an excitation signal having a frequency within a first frequency range and further determines that the tuning fork is not contacted by a liquid within the container when the oscillator produces an excitation signal having a frequency within a second frequency range, different from the first frequency range.

3. Apparatus for sensing the presence of a liquid at a predetermined location within a container, comprising:

a tuning fork assembly disposed at the predetermined location within the container, the tuning fork assembly having a first resonant frequency when disposed in the liquid and a second resonant frequency when disposed in air;

a feedback control system that conditions the tuning fork assembly to oscillate at its resonant frequency, the feedback control system including an oscillator that produces an electrical excitation signal having a frequency that is controllably adjustable over a frequency range that encompasses the first and second resonant frequencies of the tuning fork assembly, an excitation transducer configured to mechanically excite the tuning fork assembly in response to the electrical excitation signal, a receiving transducer configured to produce an electrical receive signal in response to a mechanical oscillation of the tuning fork assembly, and a phase comparator that compares the phases of the receive signal and the excitation signal and produces an error signal that is coupled to the oscillator, to condition the oscillator to produce an excitation signal that causes the tuning fork assembly to oscillate substantially at its resonant frequency;

a frequency comparator that compares the frequency of the tuning fork assembly oscillation with a predetermined threshold, to sense the presence of a liquid at the predetermined location within the container; and a device that is operable when the error signal generated by the phase comparator fails to controllably adjust the phase of the receive signal to have a predetermined relationship to the phase of the excitation signal, and thus fails to maintain the frequency of the oscillation substantially the same as the resonant frequency of the tuning fork assembly, to determine that the tuning fork assembly is contacted by a solid material.

4. Apparatus as defined in claim 3, wherein the frequency comparator determines that the tuning fork assembly is contacted by a liquid within the container when the oscillator produces an excitation signal having a frequency within a first frequency range and further determines that the tuning fork assembly is not contacted by a liquid within the container when the oscillator produces an excitation signal having a frequency within a second frequency range, different from the first frequency range.

5. Apparatus for sensing the presence of a gas, a liquid, or a solid material at a predetermined location within a container, comprising:

a tuning fork assembly disposed at the predetermined location within the container, the tuning fork assembly having a resonant frequency that is a first predetermined value when disposed in a predetermined liquid and a second predetermined value when disposed in a predetermined gas;

a phase-locked loop control system that seeks to condition the tuning fork assembly to oscillate at its resonant frequency, the phase-locked loop control system including an oscillator that produces an electrical excitation signal having a frequency that is controllably adjustable over a predetermined frequency range that encompasses the first and second resonant frequencies of the tuning fork assembly, an excitation transducer configured to mechanically excite the tuning fork assembly in response to the electrical excitation signal, a receiving transducer configured to produce an electrical receive signal in response to a mechanical oscillation of the tuning fork assembly, and a phase comparator that compares the phases of the receive signal and the excitation signal and that produces a control signal that is coupled to the oscillator, to controllably adjust the frequency of the excitation signal such that the phase of the receive signal lags the phase of the excitation signal by substantially 90 degrees, in which case the tuning fork assembly automatically oscillates substantially at its resonant frequency; and a frequency comparator operable, if the phase-locked loop control system successfully causes the tuning fork assembly to oscillate substantially at its resonant frequency, to compare the oscillation frequency with a predetermined threshold and thereby determine that the predetermined gas or the predetermined liquid is present at the predetermined location within the container, such frequency comparator further operable, if the phase-locked loop control system fails to cause the tuning fork assembly to oscillate substantially at its resonant frequency, to determine that the predetermined solid material is present at the predetermined location within the container.

6. Apparatus as defined in claim 5, wherein the phase-locked loop control system, if it fails to cause the tuning fork assembly to oscillate substantially at its resonant frequency, causes the frequency of the excitation signal to ramp repeatedly across its predetermined frequency range.

7. A method for sensing the presence of a liquid at a predetermined location within a container, comprising the steps of:

positioning a tuning fork assembly at the predetermined location within the container, wherein the tuning fork assembly has a first resonant frequency when disposed in the liquid and a second resonant frequency when disposed in air, and wherein the tuning fork assembly includes an excitation transducer configured to mechanically excite the tuning fork assembly and a receiving transducer configured to produce an electrical receive signal in response to a mechanical oscillation of the tuning fork assembly;

conditioning the tuning fork assembly to oscillate at its resonant frequency, the step of conditioning including producing an electrical excitation signal having a frequency that is controllably adjustable over a frequency range that encompasses the first and second resonant frequencies of the tuning fork assembly, applying the excitation signal to the excitation transducer of the tuning fork assembly, to cause the tuning fork assembly to oscillate at a corresponding frequency, the receiving transducer thereupon producing the receive signal in response to the oscillation, and comparing the phases of the receive signal and the excitation signal and producing an error signal that is used in the step of producing to produce an excitation signal that causes the tuning fork assembly to oscillate substantially at its resonant frequency;

comparing the frequency of the tuning fork assembly oscillation with a predetermined threshold, to sense the presence of a liquid at the predetermined location within the container; and determining that a solid material is located at the predetermined location within the container if the step of conditioning fails to cause the tuning fork assembly to oscillate substantially at its resonant frequency.

8. A method as defined in claim 7, wherein the step of conditioning seeks to adjust the frequency of the excitation signal such that the phase of the receive signal lags the phase of the excitation signal by substantially 90 degrees, in which case the tuning fork assembly automatically oscillates substantially at its resonant frequency.

9. A method as defined in claim 7, wherein the step of conditioning, if it fails to cause the tuning fork assembly to oscillate substantially at its resonant frequency, causes the frequency of the excitation signal to ramp repeatedly across its predetermined frequency range.

10. A method as defined in claim 9, and further including a step of determining that the tuning fork assembly is contacted by a solid material within the container when the frequency of the excitation signal is detected to ramp repeatedly across its predetermined frequency range.

11. A method for sensing the presence of a liquid at a predetermined location within a container, comprising the steps of:

positioning a tuning fork assembly at the predetermined location within the container, wherein the tuning fork assembly has a first resonant frequency when disposed in the liquid and a second resonant frequency when disposed in air, and wherein the timing fork assembly includes an excitation transducer configured to mechanically excite the tuning fork assembly and a receiving transducer configured to produce an electrical receive signal in response to a mechanical oscillation of the tuning fork assembly;

conditioning the tuning fork assembly to oscillate at its resonant frequency, the step of conditioning including producing an electrical excitation signal having a frequency that is controllably adjustable over a frequency range that encompasses the first and second resonant frequencies of the tuning fork assembly, applying the excitation signal to the excitation transducer of the tuning fork assembly, to cause the tuning fork assembly to oscillate at a corresponding frequency, the receiving transducer thereupon producing the receive signal in response to the oscillation, and comparing the phases of the receive signal and the excitation signal and producing an error signal that is used in the step of producing to produce an excitation signal having a frequency such that the phase of the receive signal lags the phase of the excitation signal by substantially 90 degrees, in which case the tuning fork assembly automatically oscillates substantially at its resonant frequency; and comparing the frequency of the tuning fork assembly oscillation with a predetermined threshold, to sense the presence of a liquid at the predetermined location within the container.

12. Apparatus for sensing the presence of a gas, a liquid, or a solid material at a predetermined location within a container, comprising:

a tuning fork assembly disposed at the predetermined location within the container, the tuning fork assembly having a resonant frequency that is a first predetermined value when disposed in a predetermined liquid and a second predetermined value when disposed in a predetermined gas;

a phase-locked loop control system that seeks to condition the tuning fork assembly to oscillate at its resonant frequency, the phase-locked loop control system including an oscillator that produces an electrical excitation signal having a frequency that is controllably adjustable over a predetermined frequency range that encompasses the first and second resonant frequencies of the tuning fork assembly, an excitation transducer configured to mechanically excite the tuning fork assembly in response to the electrical excitation signal, a receiving transducer configured to produce an electrical receive signal in response to a mechanical oscillation of the tuning fork assembly, and a phase comparator that compares the phases of the receive signal and the excitation signal and that produces a control signal that is coupled to the oscillator, to controllably adjust the frequency of the excitation signal such that the phase of the receive signal lags the phase of the excitation signal by a predetermined angle, and such that the tuning fork assembly oscillates substantially at its resonant frequency; and a frequency comparator operable, if the phase-locked loop control system successfully causes the tuning fork assembly to oscillate substantially at its resonant frequency, to compare the oscillation frequency with a predetermined threshold and thereby determine that the predetermined gas or the predetermined liquid is present at the predetermined location within the container, such frequency comparator further operable, if the phase-locked loop control system fails to cause the tuning fork assembly to oscillate substantially at its resonant frequency, to determine that the predetermined solid material is present at the predetermined location within the container.

13. Apparatus as defined in claim 12, wherein the phase-locked loop control system seeks to adjust the frequency of the excitation signal such that the phase of the receive signal lags the phase of the excitation signal by substantially 90 degrees.

14. Apparatus as defined in claim 12, wherein the phase-locked loop control system, if it fails to cause the tuning fork assembly to oscillate substantially at its resonant frequency, causes the frequency of the excitation signal to ramp repeatedly across its predetermined frequency range.

15. A method for sensing the presence of a liquid at a predetermined location within a container, comprising the steps of:

positioning a tuning fork assembly at the predetermined location within the container, wherein the tuning fork assembly has a first resonant frequency when disposed in the liquid and a second resonant frequency when disposed in air, and wherein the tuning fork assembly includes an excitation transducer configured to mechanically excite the tuning fork assembly and a receiving transducer configured to produce an electrical receive signal in response to a mechanical oscillation of the tuning fork assembly;

conditioning the tuning fork assembly to oscillate at its resonant frequency, the step of conditioning including producing an electrical excitation signal having a frequency that is controllably adjustable over a frequency range that encompasses the first and second resonant frequencies of the tuning fork assembly, applying the excitation signal to the excitation transducer of the tuning fork assembly, to cause the tuning fork assembly to oscillate at a corresponding frequency, the receiving transducer thereupon producing the receive signal in response to the oscillation, and comparing the phases of the receive signal and the excitation signal and producing an error signal that is used in the step of producing to produce an excitation signal having a frequency such that the phase of the receive signal lags the phase of the excitation signal by a predetermined angle, and such that the tuning fork assembly oscillates substantially at its resonant frequency; and comparing the frequency of the tuning fork assembly oscillation with a predetermined threshold, to sense the presence of a liquid at the predetermined location within the container.

16. A method as defined in claim 15, and further including a step of determining that a solid material is located at the predetermined location within the container if the step of conditioning fails to cause the tuning fork assembly to oscillate substantially at its resonant frequency.

17. A method as defined in claim 15, wherein the step of conditioning seeks to adjust the frequency of the excitation signal such that the phase of the receive signal lags the phase of the excitation signal by substantially 90 degrees.

18. A method as defined in claim 15, wherein the step of conditioning, if it fails to cause the tuning fork assembly to oscillate substantially at its resonant frequency, causes the frequency of the excitation signal to ramp repeatedly across its predetermined frequency range.

19. A method as defined in claim 18, and further including a step of determining that the tuning fork assembly is contacted by a solid material within the container when the frequency of the excitation signal is detected to ramp repeatedly across its predetermined frequency range.

* * * * *